(12) United States Patent
Tilles

(10) Patent No.: US 9,374,660 B1
(45) Date of Patent: Jun. 21, 2016

(54) INTENTIONAL MONITORING

(75) Inventor: Alexander G. Tilles, Dublin (IE)

(73) Assignee: Amazon Technologies, Inc., Seattle, WA (US)

( * ) Notice: Subject to any disclaimer, the term of this patent is extended or adjusted under 35 U.S.C. 154(b) by 846 days.

(21) Appl. No.: 13/474,275

(22) Filed: May 17, 2012

(51) Int. Cl.
| | |
|---|---|
| G08B 21/00 | (2006.01) |
| G08B 29/00 | (2006.01) |
| G08B 5/22 | (2006.01) |
| G08B 25/00 | (2006.01) |
| G08B 23/00 | (2006.01) |
| H04W 36/00 | (2009.01) |
| G06Q 10/00 | (2012.01) |
| H04W 4/02 | (2009.01) |

(52) U.S. Cl.
CPC .................................. *H04W 4/02* (2013.01)

(58) Field of Classification Search
CPC .................................................... H04W 4/24
USPC ......................................................... 340/506
See application file for complete search history.

(56) References Cited

U.S. PATENT DOCUMENTS

| | | | |
|---|---|---|---|
| 7,922,494 B2* | 4/2011 | Banerjee et al. | 434/323 |
| 2006/0173877 A1* | 8/2006 | Findeisen et al. | 707/101 |
| 2010/0214090 A1* | 8/2010 | Sartini et al. | 340/517 |
| 2011/0066445 A1* | 3/2011 | Klain et al. | 705/2 |
| 2012/0327787 A1* | 12/2012 | Mohammed et al. | 370/242 |
| 2013/0015967 A1* | 1/2013 | Nagathil et al. | 340/506 |
| 2013/0086022 A1* | 4/2013 | Black et al. | 707/705 |
| 2013/0122910 A1* | 5/2013 | Singh | H04W 36/18 455/437 |

* cited by examiner

*Primary Examiner* — Jennifer Mehmood
*Assistant Examiner* — Pameshanand Mahase
(74) *Attorney, Agent, or Firm* — Davis Wright Tremaine LLP

(57) ABSTRACT

An approach for providing intentional monitoring is provided. An alarm can be predefined with any number of metrics or thresholds for monitoring an electronic service. The predefined metrics and/or thresholds can be combined with one or more input variables selected by a customer or with one or more signals received from a network component. The alarm can be implemented using the predefined metrics, thresholds, and the one or more customer selected input variables or signals from the network component.

32 Claims, 5 Drawing Sheets

INTENTIONAL MONITORING

BACKGROUND

In current electronic service and process monitoring systems, both internal and external, customers are directly responsible for specifying rules that need to be evaluated for a monitor to go into an alarm. For example, an alarm can be triggered if a given metric (e.g., C.P.U. capacity) goes above a threshold (e.g., 90%) for more than 10 minutes. In another example, an alarm can be triggered if two other alarms are triggered. In these instances, customers must identify certain metrics and set specific thresholds for the metrics to be monitored. In another example, an alarm can be triggered if multiple alarms are triggered and/or metrics go above a threshold. In these instances, customers must identify multiple alarms, metrics, and thresholds.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
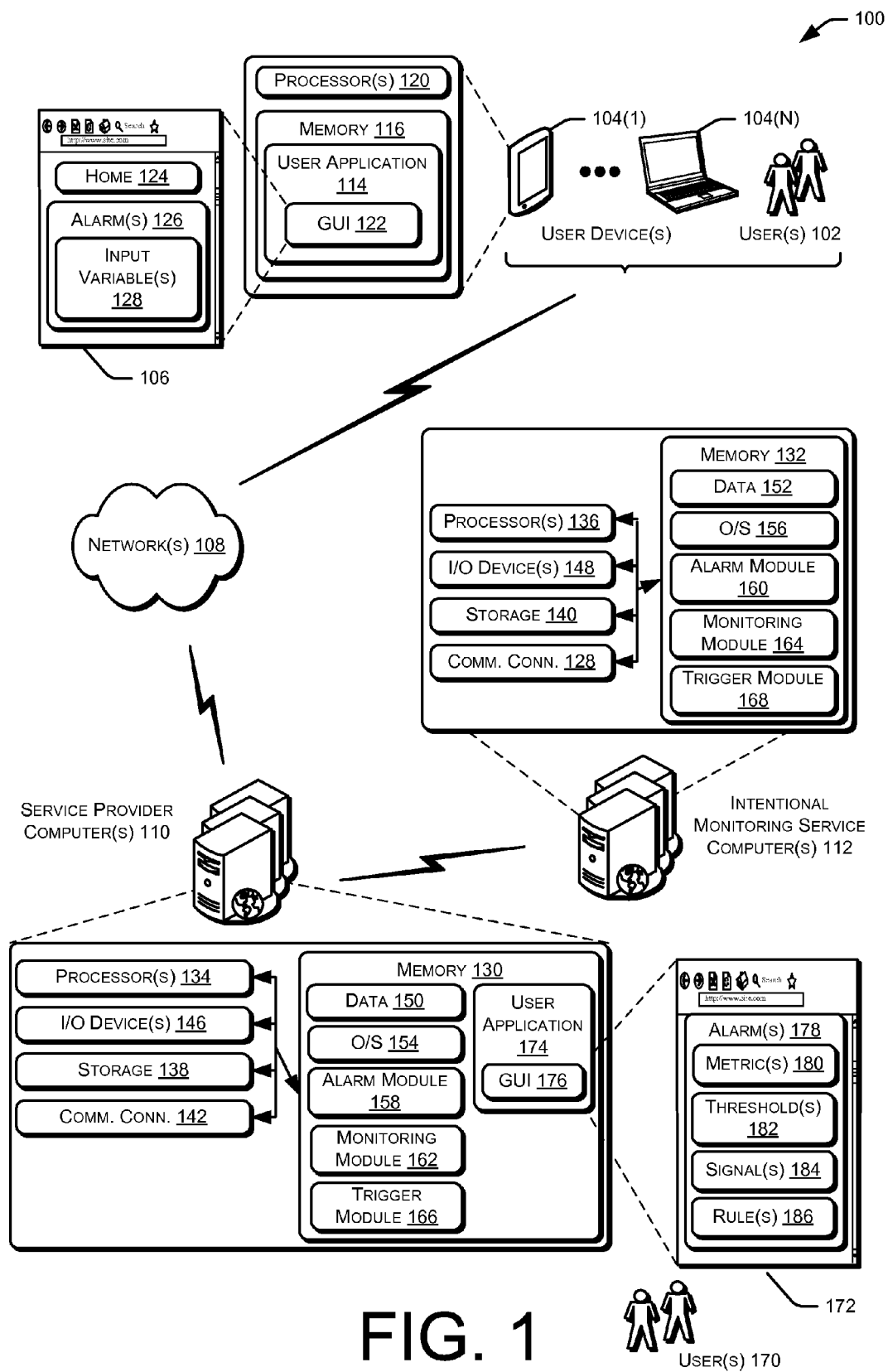
FIG. 1 illustrates an example architecture for intentional monitoring in accordance with an embodiment of the invention.

Embodiments of the present disclosure are directed to, among other things, intentional monitoring. In some systems, one or more alarms can be defined by an administrator to include one or more metrics and/or respective thresholds for monitoring an electronic service or process, such as usage of a mountable storage volume. One example use case of an alarm can be a billing amount alert alarm, which can include a metric. The metric can be a measurement of a customer's use of the electronic service or process. After the alarm is defined by the administrator, the alarm can be offered to a customer for implementation by describing the alarm to the customer and offering the alarm to the customer for selection. The description of the alarm can be a general description of the alarm without providing the underlying metrics and/or thresholds. Rather than providing the customer with details of the underlying metrics and/or thresholds for the alarm, the customer only needs to indicate his or her intent by way of selecting the offered alarm. For example, the alarm can be described to the customer as, "Monthly Billing Amount Alert: this alarm alerts you when you spend more than last month's amount." Upon customer selection of the particular alarm, the customer can provide one or more input variables for the alarm. For example, using the above example, the customer can provide or specify a billing amount, such as $100. The one or more input variables can be used to implement the alarm, and monitoring of the electronic service or process using the alarm and input variables can begin.

As another example use case, a customer may desire to implement a stuck volume alert alarm for an electronic service or process, such as usage of a mountable storage volume. Since this type of alarm can include multiple alarms with respective metrics and thresholds, all of which must be met to trigger the respective alarms prior to the stuck volume alert alarm being triggered, the alarm is defined prior to being offered to a customer. Typically, an administrator can define the metrics and respective thresholds for each of the alarms that make up the stuck volume alert alarm. After the stuck volume alert alarm is defined and stored by the administrator, the stuck volume alert alarm can be offered to a customer for implementation by generally describing the alarm to the customer. Rather than providing the customer with details of some or all the metrics and thresholds for the alarm, the customer indicates his or her intent for selecting the alarm by selecting the alarm. For example, the alarm can be described to the customer as, "Stuck Volume Alert: this alarm alerts you when a mountable storage volume becomes inoperable." Upon customer selection of the alarm, the customer may select one or more input variables, which may further customize the alarm. The alarm can then be implemented with the one or more input variables, and monitoring of the electronic service or process using the alarm and input variables can begin.

In another use case, an alarm can be defined based at least in part on a signal from an electronic service or process. The signal can be, for example, a signal associated with a detected problem with a virtual machine instance. An administrator could define an alarm using the signal in combination with any number of metrics and respective thresholds. The alarm can then be offered for selection to a customer, who may only receive a general description of the alarm rather than any of the underlying details of the alarm, such as the signal, and any number of metrics and respective thresholds. Upon selection by the customer, the alarm can be implemented to monitor the electronic service or process.

This brief introduction, including section titles and corresponding summaries, is provided for the reader's convenience and is not intended to limit the scope of the claims, nor the preceding sections. Furthermore, the techniques described above and below may be implemented in a number of ways and in a number of contexts. Several example implementations and contexts are provided with reference to the following figures, as described below in more detail. However, the following implementations and contexts are but a few of many.

Illustrative Architecture

FIG. 1 depicts an illustrative system or architecture 100 in which techniques for intentional monitoring may be implemented. In architecture 100, one or more users 102 (e.g., customers, electronic service customer, consumers, account holders, guest users, etc.) may utilize user computing devices 104(1)-(N) (collectively, user devices 104) to access at least one website 106, or a user account accessible through the website 106, via one or more networks 108. In some aspects, the website 106 and/or user account may be hosted, managed, and/or provided by a service provider, such as by utilizing one or more service provider computers 110. Additionally, in some aspects, one or more intentional monitoring service computers 112 may be in communication with the service provider computers 110 to provide intentional monitoring services for the service provider computers 110. In some aspects, a data center environment for implementing a program execution service, such as 200 in FIG. 2, can be in communication with the website 106, the service provider computers 110, and/or the intentional monitoring service computers 112 to provide intentional monitoring services. It should be understood that any functionality described herein may be provided by any of these devices and/or computers, especially by way of the service provider computers 110, the intentional monitoring service computers 112, and/or the data center environment 200. Additionally, as desired, the service provider computers 110, intentional monitoring service computers 112, and data center environment 200 may be the same or hosted on the same computer.

In some examples, the networks 108 may include any one or a combination of multiple different types of networks, such as cable networks, the Internet, wireless networks, cellular networks, and other private and/or public networks. While the illustrated example represents the users 102, such as customers, accessing the website 106 over the networks 108, the described techniques may equally apply in instances where the users 102 interact with a service provider computer 110 via the one or more user devices 104 over a landline phone, via a kiosk, or in any other suitable manner. It is also noted that the described techniques may apply in other client/server arrangements (e.g., set-top boxes, etc.), as well as in non-client/server arrangements (e.g., locally stored software applications, etc.). Additionally, certain alarms may be defined and implemented by the service provider computers 110, intentional monitoring service computers 112, and/or data center environment 200 in the absence of user interaction with the website 106.

As described briefly above, the website 106 may allow the users 102, such as customers, to interact with a service provider computer 110, such as to interact with other users, purchase goods and/or services, and/or to access various user accounts hosted by or provided by the service provider computer 110 and associated with the user 102. In some instances, a user 102 may access the website 106 without logging in, such as when browsing and/or reading general content, etc. However, in other instances, the service provider computer 110 may request that the user 102 log in to perform specific requests such as, but not limited to, posting comments, interacting and/or connecting with other users, changing user information, purchasing items and/or services, accessing private account holder information, or the like.

With continued reference to FIG. 1, one or more service provider computers 110, perhaps arranged in a cluster of servers or as a server farm, may host the website 106. Other server architectures may also be used to host the website 106. The website 106 may be capable of handling requests from many users 102 and serving, in response, various user interfaces that can be rendered at the user devices 104. The website 106 can be any type of website that supports user interaction, including social networking sites, online retailers, electronic service sites, informational sites, blog sites, search engine sites, news and entertainment sites, and so forth. As discussed above, the described techniques can similarly be implemented outside of the website 106.

In some examples, a user 102, such as a customer, may log in or otherwise enter a session. The log-in may be based on receipt of log-in credentials such as a user identifier ("ID") and/or a password. However, in some examples, the service provider may utilize cookies or some other state-verifying technique to determine that a user 102 is still logged in or was last logged in from the same computing device such as, but not limited to, user device 104. Alternatively, or in addition, a user 102 may maintain a session over multiple log-ins, using multiple different user devices 104, and/or over a period of time that may be longer than a typical web browser session. In some aspects, the intentional monitoring service computers 112 and/or the data center environment 200 may be configured to keep track of actions, events, and/or occurrences associated with one or more session IDs, user IDs, web sessions, log-in sessions, and/or user accounts. As such, in some examples, the actions, events, and/or occurrences of a user 102 (or multiple users) may be utilized to generate customer preferences, customer use patterns, and/or any number of metrics and/or thresholds associated with an alarm or with a user 102.

In one non-limiting example, a user 102, such as a customer, may access a website 106 via a user application 114 of at least one of the user devices 104. The user application 114 may include computer-executable instructions stored in memory 116 of the user device 104 and executed by a processor 118 associated with the user device 104. In some aspects, the user application 114 may be a Web browser, a mobile application, a dedicated application, or any way of accessing the website 106. As such, the user application 114 may provide and receive hypertext markup language ("HTML") requests and responses from a server, such as the service provider computers 110. In some examples, the website 106 may be hosted by the service provider computers 110 or any other Web server. The user 102 may be presented with a graphical user interface ("GUI") 122 that may provide a home screen 124, where the user 102 can select a previously defined alarm 126 to monitor an electronic service or process, and indicate one or more input variables 128 for the selected alarm. The alarm 126 may be selected from a list of selectable alarms, wherein each alarm can include a respective general description. The input variables 128 can include, for example, quantities, monetary expressions, billing amounts, billing periods, consumption amounts, or consumption periods. Example electronic services or processes can include, but are not limited to, a mountable storage volume service, a cloud computing service, a database service, a workflow management service, a queue service, a load balancing service, a map reduce service, or a cluster computer service.

In some embodiments, one or more alarms 126 can be predefined by a service provider or administrator, and stored in a data storage device associated with or otherwise accessible by the service provider computer 110. Each of the alarms 126 can include one or more metrics, respective thresholds, and/or signals, which have been predefined by the service provider or administrator. The alarms 126 may be offered for selection to the user 102 via the interface 116. Each of the alarms 126 may be described by the service provider or administrator on the website 106 in user friendly terms, such as by using a general description of the alarm without reference to the underlying metrics, thresholds, and/or signals. For example, an alarm such as "stuck volume alert" can include a general statement, such as, "This alarm alerts you when a mountable storage volume becomes inoperable." In this manner, the user 102 can concern himself with the general intent of the alarm, and avoid time consuming involvement in some or all of the technical details for defining the alarm with associated metrics, thresholds, and/or signals.

In one example, one or more alarms 126 offered to the user 102 via the interface 122 may include one or more input fields or boxes operable to receive one or more input variables from the user 102. An alarm 126 offered to a customer may be a billing amount alert, for which an input field or box can be included to permit the customer to input a monetary amount as an input variable to implement the alarm. For example, an alarm and input field such as "Billing Amount Alert: This alarm alerts you when you spend more than $_.00." can be offered to a customer. After the user 102 selects the alarm 126 and provides one or more input variables 128, such as a billing amount of "100," the input variables 128 can be used by the service provider computers 110 and/or intentional service monitoring computers 112 to implement one or more corresponding alarms.

In some embodiments, the interface 122 can permit a user 102 to input code to select one or more alarms 126 and input variables 128. For example, the interface 122 can be an API (application program interface) that permits entry of one or more program commands corresponding to selection of a particular alarm 126 and one or more input variables 128. In some embodiments, an interface 122 can call a particular API, which may create and/or configure a selected alarm 126 with one or more input variables 128. In any instance, the input code and/or program commands can be received by the service provider computers 110, intentional monitoring service computers 112, and/or data room environment 200, and a selected alarm 126 can be implemented with the one or more input variables 128.

In some embodiments, the user 102 may be charged or otherwise billed for selecting a particular alarm, such as 126. The service provider or administrator may set a price for the alarm 126, or may otherwise provide a pricing plan or schedule at which the user 102 is charged or billed. Any number of pricing plans or schedules can be used, such as charging the user a predefined price when a particular alarm is selected, monitored, and/or triggered.

In some embodiments, the interface 122 can provide the user 102 with performance data associated with the monitoring of the selected alarm 126. When the selected alarm 126 is ultimately triggered, such as by one or more thresholds and/or input variables being met or exceeded, an indication to the user 102 can be generated and output to the interface 122, thereby alerting the user 102 to the triggering of the alarm 126. In some embodiments, a notification can be transmitted to the user 102 via wireless or wired communications, such as by email, text, phone call, fax, or other modes of communication.

As noted above, the architecture 100 may include one or more service provider computers 110 and intentional monitoring service computers 112. The service provider computers 110 and intentional monitoring service computers 112 may include any type of computing devices such as, but not limited to, mobile, desktop, thin-client, server, and/or cloud computing devices. In operation, service provider computers 110 and intentional monitoring service computers 112 may each be configured to execute computer-executable instructions in order to form a respective special-purpose computer or particular machine that facilitates alarm definition and intentional monitoring services. In some examples, the service provider computers 110 may be in direct communication with the intentional monitoring service provider computers 112 or via the networks 108, or via other network connections. In certain embodiments, the service provider computers 110 and/or intentional monitoring service provider computers 112 may include one or more servers, perhaps arranged in a cluster, as a server farm, or as individual servers not associated with one another. These servers may be configured to host, receive, store, facilitate, and/or process alarm definition and intentional monitoring service requests from the one or more service provider computers 110 and/or intentional monitoring service provider computers 112. Additionally, these servers may be configured to host, receive, define, store, monitor, trigger, process, and/or change one or more alarms. As noted above, in some instances, these services may be performed for, or at the request of, the service provider computers 110 and/or intentional monitoring service provider computers 112. Additionally, in some aspects, various services may be separate and distinct from one another (and/or implemented on different machines by different providers), while in other aspects, the various services may be provided by a single computer and/or may be integral to the computer. For example, the service provider computers 110 may be included with the intentional monitoring service computers 112 in a single, integrated, distributed computing environment such that the host of the website 106 performs or facilitates alarm definition and intentional monitoring services on its own.

In one illustrative configuration, the service provider computers 110 and intentional monitoring service computers 112 may include at least one respective memory 130, 132 and one or more respective processing units (or processor(s)) 134, 136. In some examples, the processor(s) 134, 136 of the service provider computers 110 and/or intentional monitoring service computers 112 may be implemented as appropriate in hardware, software, firmware, or combinations thereof. Various implementations of the processor(s) 134, 136 may include computer-executable or machine-executable instructions written in any suitable programming language to perform the various functions described.

The respective memories 130, 132 may store program instructions that are loadable and executable on the processor(s) 134, 136, as well as data generated during the execution of these programs. Depending on the configuration and type of service provider computers 110 and/or intentional monitoring service computers 112, the respective memories 130, 132 may be volatile (such as random access memory ("RAM")) and/or non-volatile (such as read-only memory ("ROM"), flash memory, etc.). The service provider computers 110, intentional monitoring service computers 112, or servers may also include respective additional storage 138, 140, which may include removable storage and/or non-removable storage. The additional storage 138, 140 may include, but is not limited to, magnetic storage, optical disks, and/or tape storage. The disk drives and their associated computer-readable media may provide non-volatile storage of computer-readable instructions, data structures, program modules, and other data for the computing devices. In some implementations, the respective memories 130, 132 may include multiple different types of memory, such as static random access memory ("SRAM"), dynamic random access memory ("DRAM"), or ROM.

The respective memories 130, 132 and the additional storage 138, 140, both removable and non-removable, are all examples of computer-readable storage media. For example, computer-readable storage media may include volatile and non-volatile, removable and non-removable media implemented in any method or technology for storage of information such as computer-readable instructions, data structures, program modules, or other data. The respective memories 130, 132 and the additional storage 138, 140 are all examples of computer storage media.

The service provider computers 110 and intentional monitoring service computers 112 may also contain respective communications connection(s) 142, 144 that allow communications with stored databases, other computing devices or servers, user terminals, and/or other devices on the networks 108. The service provider computers 110 and intentional monitoring service computers 112 may also include input/output ("I/O") device(s) 146, 148, such as a keyboard, a mouse, a pen, a voice input device, a touch input device, a display, speakers, a printer, etc., that facilitate user interaction with the service provider computers 110 and intentional monitoring service computers 112.

Turning to the contents of the respective memories 130, 132 of the service provider computers 110 and intentional monitoring service computers 112 in more detail, the memories 130, 132 may include a wide variety of respective data 150, 152 and/or other stored data (e.g., data files, customer profiles, user profiles, etc.), respective operating systems ("OS") 154, 156, and one or more application programs or services for implementing the features disclosed herein, including respective alarm modules 158, 160, respective monitoring modules 162, 164, and respective trigger modules 166, 168. The data 150, 152 may include a wide variety of data associated with any number of services including, but not limited to, alarm data, metric data, threshold data, rule data, input variables, electronic service data or signals, monitoring data or signals, customer input data, customer use patterns, customer profiles, user profiles, etc. The data 150, 152 may be obtained from any number of suitable sources, such as user devices 104, service provider computers 110, intentional monitoring service computers 112, and/or a data room environment 200 or associated component. In addition to storing data 150, 152, in certain embodiments, information associated with events, actions, and/or other user interactions with various products and/or services may be stored. Indeed, a wide variety of information associated with products and/or services may be stored in the memories 130, 132. The OS 154, 156 may include one or more suitable applications and/or program modules that facilitate the general operation of the service provider computers 110 and intentional monitoring service computers 112, as well as the execution of one or more of the additional application programs.

The alarm modules 158, 160 may include any number of suitable applications and/or modules configured to receive data 150, 152 associated with alarms, metrics, thresholds, rules, signals, and input variables. The alarm modules 158, 160 can receive one or more selected metrics, respective thresholds, rules, signals, and input variables from a user, such as 102 or 170, to define an alarm for an electronic service or process. The alarm modules 158, 160 can receive this information and other data, and store it as data 150, 152 in respective memory 130, 132 or another data storage device. For example, one or more users 170 (e.g., administrators, service provider personnel, etc.) may access an administrative webpage 172 generated by a user application 174 operating in conjunction with the alarm module 158. The user application 174 can include computer-executable instructions stored in memory 130 and executed by the processor 134. The user 170, such as an administrator, may be presented with a graphical user interface ("GUI") 176 that may provide the user 170 with functionality to define one or more alarms 178 by inputting one or more metrics 180, respective thresholds 182, and/or signals 184 for each alarm. In some embodiments, the interface 176 can permit a user 170 to input code to define one or more alarms 178 including one or more metrics 180, thresholds 182, or signals 184. For example, the interface 176 can include an API (application program interface) that permits entry of one or more program commands corresponding to definition of a particular alarm 178 including one or more metrics 180, respective thresholds 182, and/or signals 184. In some embodiments, an interface 176 can call a particular API, which may create and/or configure a particular alarm 178 including one or more metrics 180, respective thresholds 182, and/or signals 184.

In some embodiments, an alarm can include multiple alarms, wherein one or more rules 186 for an alarm can also be input, such as "IF THRESHOLD FOR METRIC #1 IS MET, THEN ALARM #1 IS SATISFIED, AND IF THRESHOLD FOR METRIC #2 IS MET, THEN ALARM #2 IS SATISFIED, AND IF THRESHOLD FOR METRIC #3 IS MET, THEN ALARM #3 IS SATISFIED, THEN OVERALL ALARM IS INITIATED." A rule 186, for example, can include any number of Boolean or other logical operators to implement one or more alarms.

Figure 2:
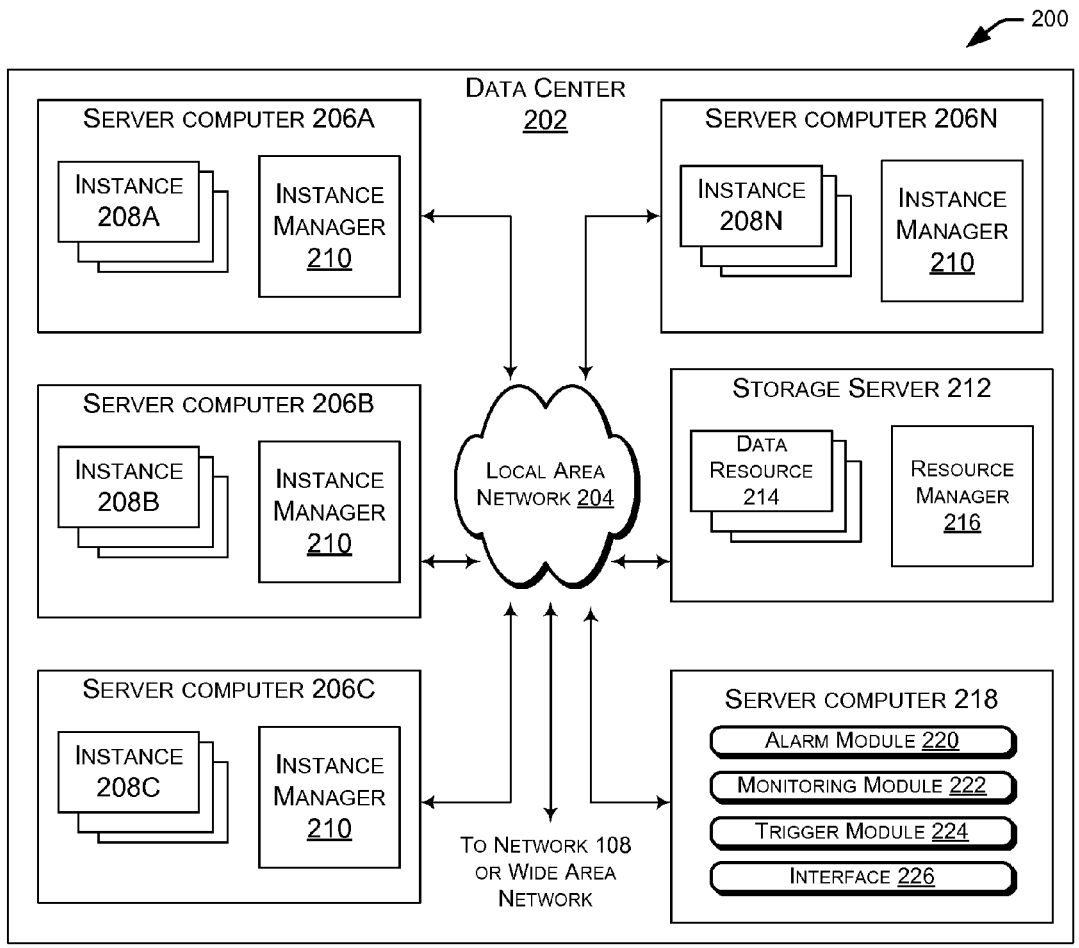
FIG. 2 illustrates an example architecture for intentional monitoring in an electronic service environment in accordance with an embodiment of the invention.

In some embodiments, an alarm can be defined using one or more signals 184 from an electronic service or electronic service component, such as shown in FIG. 2. For example, a signal 184 can be a signal associated with a detected electronic service problem or problem with an electronic service component, such as an instance, or a volume or data resource. In another example, a signal 184 can be a status signal from an electronic service component, or a status signal from an electronic service. In any case, the signals 184 can be received by an alarm module, such as 158, 160, and a user 170, such as an administrator, can define an alarm using one or more signals 184 with any number of metrics and/or respective thresholds. The predefined alarm can be stored by the alarm module 158, 160 for subsequent selection by a user 102 or customer.

The one or more alarms 178 defined by the user 170 can be stored as data 150 in memory 130 or another data storage device associated with or otherwise accessible by the service provider computer 110. Some or all of the alarms 178 may be offered for selection, as described above, to a user 102, such as a customer, via the interface 116 at website 106. In this manner, the user 170, such as an administrator, can define alarms with associated metrics, thresholds, and/or rules and shield from a customer, such as user 102, some or all of the technical details, including metrics, thresholds, signals, and rules for the alarms.

In some embodiments, an alarm module, such as 160, can change one or more metrics or thresholds based at least in part on previously collected or stored customer data or an alarm pattern. For example, the alarm module 160 can change one or more metrics or thresholds for a predefined alarm, or otherwise receive a command or instructions from a user 170, such as an administrator, to change one or more metrics, thresholds, and/or signals based at least in part on previously collected or stored customer data for an alarm or an alarm pattern determined by the alarm module 160, monitoring module 162 or 164, and/or trigger module 166 or 168.

In one example, previously collected or stored customer data for an alarm can include aggregated data for multiple customers selecting the same or similar alarms over the past 12 months. For example, if a relatively large number of users or customers, such as 102, set alarms for a stuck volume alarm, an alarm module, such as 160, or an administrator, such as 170, can make certain observations or analyses about some or all of the previously collected or stored customer data. These observations or analyses can lead to changes or improvements in one or more metrics and/or thresholds for a particular alarm, such as the stuck volume alarm. A user 170, such as an administrator, can redefine the alarm using the alarm module 160 to change or improve one or more metrics, thresholds, and/or signals for the alarm. Generally, the users or customers, such as 102, will be shielded from learning that the alarm has been redefined. In this manner, changes or improvements to one or more predefined alarms can be made without having to alert or notify users or customers, who may not care or want to know that the underlying details of the alarms have been changed, improved, or redefined.

In some embodiments, an alarm module, such as 158, can charge the customer based at least in part on a type of alarm selected by a user, such as 102. For example, an alarm module 158, can charge a monetary amount to the user 102 or customer based at least in part on a type of alarm selected by the user 102. Each type of alarm, such as a predefined alarm, can have a specific price that the user 102 or customer can be charged upon selection of the alarm by the user 102 or customer.

The respective memories 122 may also include a monitoring module 162, 164, which may include any number of suitable applications and/or modules configured to interact with the alarm modules 158, 160 as needed, and to receive various data 150, 152, including any number of alarms, metrics, thresholds, rules, and input variables, from memories 130, 132. Each monitoring module 162, 164 can also receive or otherwise monitor real time or near real time performance data associated with an electronic service or process. In operation, each monitoring module 162, 164 may receive one or more alarms, metrics, thresholds, signals, rules, and input variables, from a respective alarm module 158, 160, and compare various performance data from the electronic service or process to some or all of the alarms, metrics, thresholds, signals, rules, and input variables. In some embodiments, each monitoring module 162, 164 may receive respective data 150, 152, such as one or more alarms, metrics, thresholds, signals, rules, and input variables, from a respective memory 130, 132, and compare various performance data from the electronic service or process to some or all of the alarms, metrics, thresholds, signals, rules, and input variables. In any instance, any number of alarms, metrics, thresholds, signals, rules, and input variables can be applied by the monitoring modules 162, 164 against various performance data from the electronic service or process to determine when to trigger a corresponding alarm.

In one use case, a billing amount alert alarm can be previously defined by a user 170, such as an administrator, and may be selected by or otherwise implemented by a user 102, such as a customer. A monitoring module, such as 162, may apply one or more associated metrics, respective thresholds, and rules to an electronic service or process of interest to the user 102. If the user 102 or customer has provided an input variable for the alarm, the monitoring module 162 may apply the customer input variable to the electronic service or process of interest to the user 102. The monitoring module 162 can receive the one or more metric, respective thresholds, signals, rules, and input variables from either an alarm module, such as 158, or from previously stored data 150 in memory 130 or another data storage device. The monitoring module 162 can compare various real time or near real time performance data received from an electronic service or process to the one or more metrics, respective thresholds, signals, rules, and input variables associated with the billing amount alert alarm. In this example use case, the billing amount alert alarm can include at least 2 metrics, such as a predefined number of evaluation periods of predefined duration; as well as respective thresholds, such as 6 evaluation periods of 4 hour duration. The billing amount alert alarm can also include a customer input variable of $100.00 as a monetary limit. The monitoring module 162 can compare the one or more metrics, respective thresholds, signals, and input variables to various real time or near real time performance data received from an electronic service or process, and can also apply any number of rules to the one or more metrics, respective thresholds, signals, and input variables. In any instance, the monitoring module 162 can determine when one or more thresholds are met or exceeded, and the monitoring module 162 can further determine when an alarm can be triggered.

In some embodiments, an alarm can include multiple alarms with multiple metrics, respective thresholds, and one or more rules. A monitoring module, such as 164, can apply the one or more rules to the metrics and determine when some or all of the thresholds are met or exceeded, and thus, when all of the respective alarms can be triggered. For example, in another use case, a stuck volume alert alarm can be previously defined by a user 170, such as an administrator, and may be selected by or otherwise implemented by a user 102, such as a customer. The stuck volume alert alarm may include 3 alarms: read volume, write volume, and queue length. Each of the alarms can include a metric and respective threshold, which can be: METRIC #1: maximum read throughput=0, METRIC #2: maximum write throughput=0, and METRIC #3: average queue length >0. The Stuck Volume Alert alarm can also include one or more rules, such as "IF THRESHOLD FOR METRIC #1 SATISFIED, AND THRESHOLD FOR METRIC #2 IS SATISFIED, AND THRESHOLD FOR METRIC #3 IS SATISFIED, THEN INITIATE STUCK VOLUME ALARM." The monitoring module 164 can determine when the thresholds of all the respective metrics are met, thus satisfying the conditions for one or more rules, and then the stuck volume alert alarm can be triggered. Thus, in this example, the monitoring module 164 may apply the associated metrics, respective thresholds, and rules of the stuck volume alert alarm to the electronic service or process of interest to the user 102, such as usage of a mountable storage volume. The monitoring module 164 can receive the metrics, respective thresholds, and rules from either an alarm module, such as 160, or from previously stored data 152 in memory 132 or another data storage device. The monitoring module 164 can compare various real time or near real time performance data received from the electronic service or process to the metrics, respective thresholds, and rules associated with the stuck volume alert alarm. The monitoring module 164 can compare the metrics and respective thresholds to various real time or near real time performance data received from the electronic service or process, and can implement the one or more rules. When the monitoring module 164 determines that all of the thresholds for the respective metrics are met or exceeded, each of the corresponding alarms are triggered, and the one or more rules are met, the monitoring module 164 can determine when the stuck volume alert alarm can be triggered.

With continued reference to FIG. 1, the respective memories 130, 132 may also include a trigger module 166, 168. After a monitoring module, such as 162, determines that an alarm is triggered, the monitoring module 162 can interact with a respective trigger module 166 to implement an alert or notification of the user 102, such as a customer. In some aspects, the trigger module 166 may be configured to implement one or more actions, control actions, notifications, alerts, or other activities depending on the definition of the triggered alarm. Implementing a triggered alarm may involve interacting with any number of other applications and/or modules to process the triggered alarm, and notify one or more users 102, 170 regarding the triggered alarm. Notification of a user 102, such as a customer, can be accomplished by any one of a variety of techniques including, but not limited to, output of an indication on the website 106, transmitting an email, transmitting a message, transmitting a text, transmitting a fax, or initiating or placing a phone call or other communication. Notification of a user 170, such as an administration, can be similarly accomplished including, but not limited to, output of an indication on an administrative webpage 172, transmitting an email, transmitting a message, transmitting a text, transmitting a fax, or initiating or placing a phone call or other communication.

In some embodiments, a trigger module, such as 166, can charge the customer based at least in part on a type of alarm and the triggering of the alarm. For example, the trigger module 166 can charge a monetary amount to the user 102 or customer based at least in part on a type of alarm and the triggering of the alarm. Each type of alarm, such as a predefined alarm, can have a specific price that the user 102 or customer can be charged.

Additional types of computer storage media that may be present in the service provider computers 110 and/or the intentional monitoring service computers 112 may include, but are not limited to, programmable random access memory ("PRAM"), SRAM, DRAM, RAM, ROM, electrically erasable programmable read-only memory ("EEPROM"), flash memory or other memory technology, compact disc read-only memory ("CD-ROM"), digital versatile discs ("DVD") or other optical storage, magnetic cassettes, magnetic tape, magnetic disk storage or other magnetic storage devices, or any other medium which can be used to store the desired information and which can be accessed by the service provider computers 110, the intentional monitoring service computers 112, and/or other computing devices. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

FIG. 2 is an example architecture for intentional monitoring in an electronic service environment in accordance with an embodiment of the invention. In some embodiments, the environment 200 shown in FIG. 2 can implement a program execution service, such as for launching a virtual machine instance or using a mountable storage volume. In some embodiments, a service provider computer 110 or an intentional monitoring service computer 112 shown in FIG. 1 may have or otherwise include similar structures and functionality as the architecture 200 and data center 202 shown in FIG. 2. The example environment 200 and data center 202 shown in FIG. 2 may communicate with one or more client devices, such as 104 in FIG. 1, via a local area network 204 in communication with a network, such as 102 in FIG. 1, or a wide area network.

The data center 202 shown in FIG. 2 can include several server computers 206A-206N (which may be referred herein singularly as "a server computer 206" or in the plural as "the server computers 206") for providing computing resources for executing an application. The server computers 206 may be standard tower or rack-mount server computers configured appropriately for providing the computing resources described above. For instance, in one implementation the server computers 206 can be configured to provide instances 208A-208N of computing resources.

In one embodiment, the instances 208A-208N (which may be referred herein singularly as "an instance 208" or in the plural as "the instances 208") can be virtual machine instances. As known in the art, a virtual machine instance is an instance of a software implementation of a machine (i.e. a computer) that executes programs like a physical machine. In the example of virtual machine instances, each of the servers 206 may be configured to execute an instance manager 210 capable of executing the instances. The instance manager 210 might be a hypervisor or another type of program configured to enable the execution of multiple instances 208 on a single server 206, for example. As discussed above, each of the instances 208 may be configured to execute all or a portion of an application.

It should be appreciated that although certain embodiments disclosed herein are described primarily in the context of virtual machine instances, other types of instances can be utilized with the concepts and technologies disclosed herein. For instance, the technologies disclosed herein might be utilized with instances of storage resources, instances of data communications resources, and with other types of resources. The embodiments disclosed herein might also execute all or a portion of an application directly on a computer system without utilizing virtual machine instances.

In one embodiment, one or more of the servers in the data center 202 can be a storage server 212. For instance, in one implementation at least one storage server 212 can be configured to provide elastic block storage or data storage resources. As known in the art, elastic block storage can be implemented by initiating virtual machine instances with respective network connections to data resources 214 in the storage server 212. In the example of data resources 214 shown in FIG. 2, the storage server 212 may be configured to execute a data resource manager 216 capable of executing the instances and maintaining the connections to the data resources 214.

The data center 202 shown in FIG. 2 can also include a server computer 218 reserved for executing software components for monitoring certain operations of the data center 202, the server computers 204, the instances 208, and the data resources 214. In particular, the server computer 204 might execute an alarm module 220, a monitoring module 222, and a trigger module 224. In this embodiment, an administrator of the electronic service provided by the data center 202 can utilize an interface 226, similar in function to interface 176 in FIG. 1, to access the alarm module 220 to define one or more alarms to monitor the operation of the electronic service provided by the data center 202. Similarly, a customer of the electronic service provided by the data center 202 might utilize the interface 226, via a client device 104 shown in FIG. 1, to access the alarm module 220 to select one or more predefined alarms for monitoring the instances 208 and/or data resources 214 purchased by the customer. For example, the customer may purchase instances 208 and select one or more predefined alarms, such as a billing alert alarm, to monitor performance of the configuration of the instances 208. In another example, the customer may purchase data resources 214 and select one or more predefined alarms, such a stuck volume alarm, to monitor performance of the configuration of data resources 214. Using functionality provided by the alarm module 220, which is similar to that described for alarm modules 158 and 160 shown in FIG. 1, the customer can specify how the purchased instances and/or data resources are to be monitored. For example, the customer may provide an input variable of a billing amount for a billing alert alarm. In another example, the customer may provide an input variable of which data resource to monitor for a stuck volume alarm. In any case, the alarm module 220 uses the customer input variables to implement the respective predefined alarms.

The monitoring module 222 of FIG. 2 operates similarly to the monitoring modules 162, 164 described in FIG. 1, and the trigger module 224 operates similarly to the trigger modules 166, 168 described in FIG. 1.

Each of the alarm module 220, monitoring module 222, and trigger module 224 may execute on a single server computer 218 or in parallel across multiple server computers 206 in the data center 202. In addition, each of the alarm module 220, the monitoring module 222, and trigger module 224 may consist of a number of subcomponents executing on different server computers 206 or other computing devices in the data center 202. The alarm module 220, monitoring module 222, and trigger module 224 may be implemented as software, hardware, or any combination of the two. The alarm module 220, monitoring module 222, and trigger module 224 may monitor any electronic service component in the data center 202 over an internal management network, for example.

It should be appreciated that the network topology illustrated in FIGS. 1 and 2 has been greatly simplified and that many more networks and networking devices may be utilized to interconnect the various computing systems disclosed herein. Appropriate load balancing devices or software modules might also be utilized for balancing a load between any number of data centers 202, between each of the server computers 206A-206N in each data center 202, and between instances 208 and/or data resources 214 purchased by each customer. These network topologies and devices should be apparent to those skilled in the art.

It should be appreciated that the data center 202 described in FIG. 2 is merely illustrative and that other implementations might be utilized. In particular, functionality described herein as being performed by the alarm module 220, the monitoring module 222, and the trigger module 224 might be performed by one another, might be performed by other components, or might be performed by a combination of these or other components. Additionally, it should be appreciated that this functionality might be implemented in software, hardware, or a combination of software and hardware. Other implementations should be apparent to those skilled in the art.

In one embodiment, the intentional monitoring functionality provided by the architectures illustrated in FIGS. 1 and/or 2 can be implemented with externally sourced data, such as from a third party vendor. For example, intentional monitoring services could be provided by one entity to another entity. One may recognize the applicability of various embodiments of the intentional monitoring functionality to a variety of architectures, industries, and electronic services.

Illustrative User Interfaces

Figure 3:
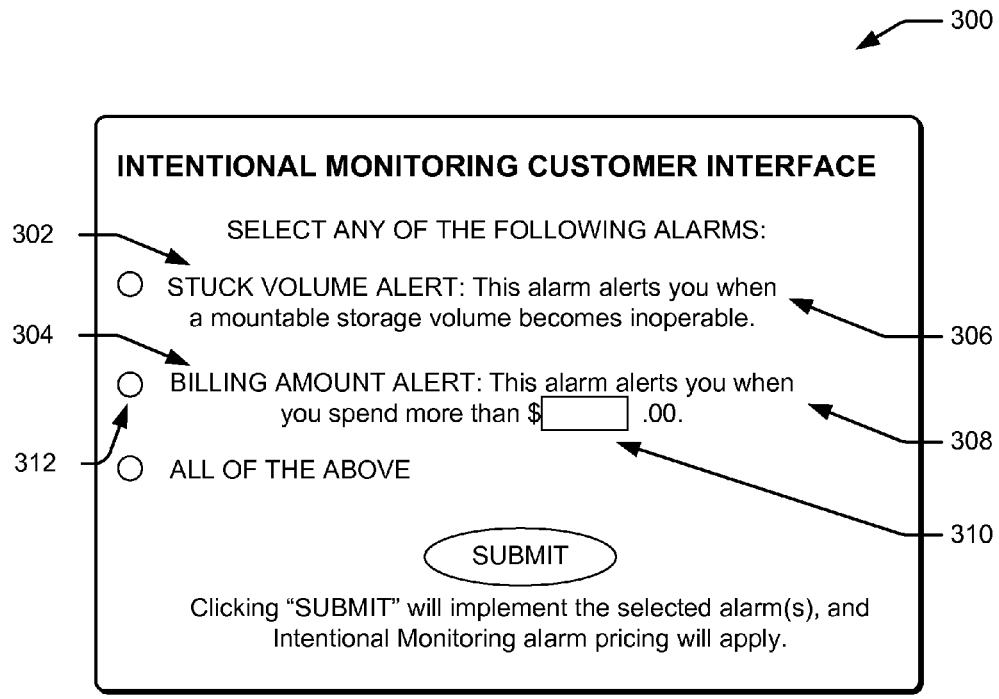
FIG. 3 illustrates an example user interface for intentional monitoring in accordance with an embodiment of the invention.

FIG. 3 illustrates an example user interface 300 for a user, such as a customer, to utilize systems and methods according to an embodiment of the invention. The user interface 300 can operate similar to the website 106 shown and described in FIG. 1, or interface 226 in FIG. 2. The user interface 300 illustrates two example alarms 302, 304, which can be predefined for selection by a user or customer. The example alarms 302, 304 include a general description 306, 308, of an alarm the user or customer wants to set to monitor a particular electronic service or process. Any number of alarms and corresponding descriptions can be predefined for user or customer review and selection on the user interface 300. In some embodiments, one or more input fields or boxes, such as 310, can be provided to receive one or more customer input variables for a respective alarm. In the example of FIG. 3, the input field 310 is operable to receive a customer input variable, such as a monetary amount, which can be stored by an alarm module, such as 158 or 160, for subsequent retrieval from memory 130 or 132 and processing by an alarm module 158, 160, 220, and/or a monitoring module, such as 162, 164, 222. After the user or customer decides which alarm or alarms to select, the user or customer can select the desired alarm or alarms using the radio button 312, and submit the alarm selection to an alarm module, such as 158, 160, 220.

Figure 4:
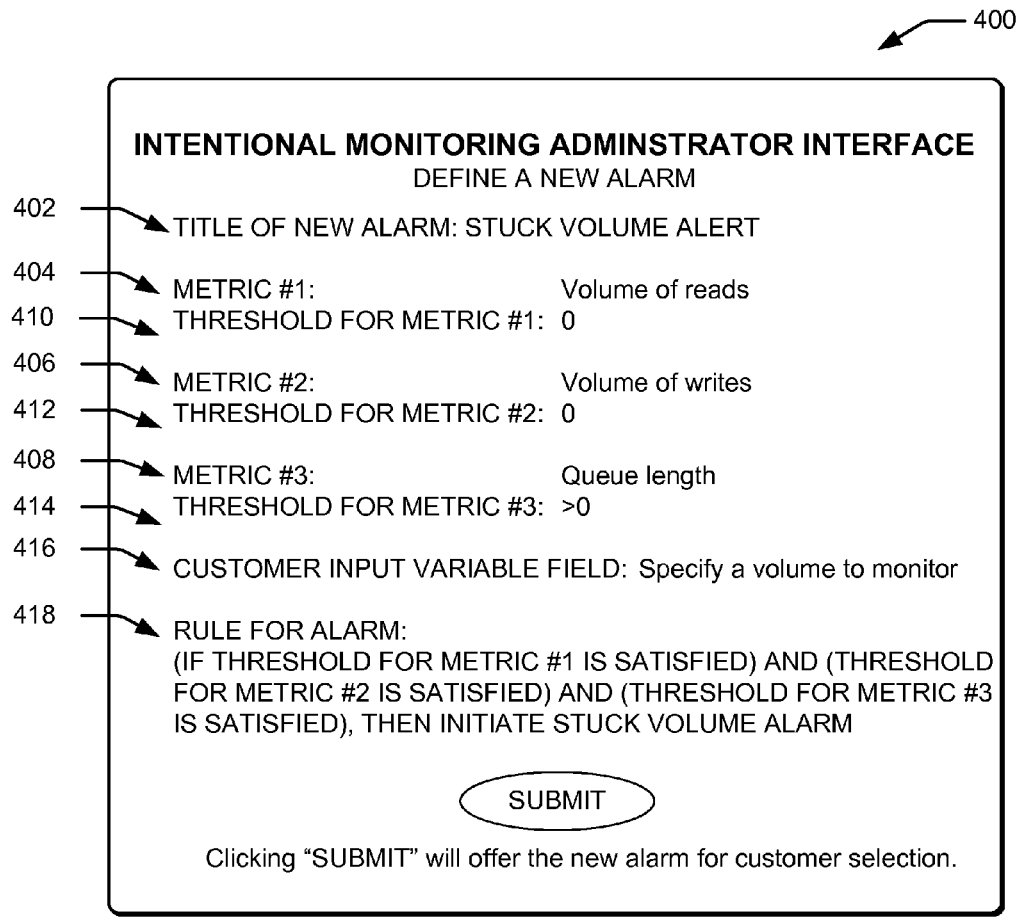
FIG. 4 illustrates another example user interface for intentional monitoring in accordance with an embodiment of the invention.

FIG. 4 illustrates an example user interface 400 for a user, such as an administrator, utilizing an intentional monitoring system and method according to an embodiment of the invention. The user interface 400 can operate similar to the webpage 172 shown and described in FIG. 1, or interface 226 in FIG. 2. The user interface 400 illustrates an example alarm 402, such as a Stuck Volume Alert alarm, which can be predefined for selection by a user or customer. The example alarm 402 can include one or more metrics 404, 406, 408, and respective thresholds 410, 412, 414, all of which are predefined by a user or administrator for an electronic service or process to be monitored. Any number of metrics and thresholds can be predefined by a service provider or administrator. In some embodiments, one or more input fields or boxes can be provided by the user or administrator to receive one or more customer input variables for a respective alarm. In the example of FIG. 4, an option 416 to add an input variable field is selected as "Specify a volume to monitor." In some embodiments, if an alarm includes multiple alarms, a rule 418 for an alarm can be input, such as "(IF THRESHOLD FOR METRIC #1 IS SATISFIED) AND (IF THRESHOLD FOR METRIC #2 IS SATISFIED) AND (IF THRESHOLD FOR METRIC #3 IS SATISFIED), THEN INITIATE STUCK VOLUME ALARM." A rule, such as 418, can include any number of Boolean or other logical operators to implement one or more alarms. After the user or administrator decides how to define one or more alarms, the user or administrator can submit the alarm selection to an alarm module, such as 158, 160, 220 for storage and subsequent offering to a customer for selection and implementation.

The user interfaces 300, 400 and the associated operations represent computer-executable instructions stored on one or more computer-readable storage media that, when executed by one or more processors, perform the associated operations. Generally, computer-executable instructions include routines, programs, objects, components, data structures, and the like that perform particular functions or implement particular data types. Additionally, the user interface and associated operations may be implemented or otherwise performed by any number of suitable architectures and/or associated components, such as the architectures 100, 200 and associated service provider computers 110 and/or intentional monitoring service computers 112 illustrated in FIG. 1, and/or data center 202 illustrated in FIG. 2.

Illustrative Processes

Figure 5:
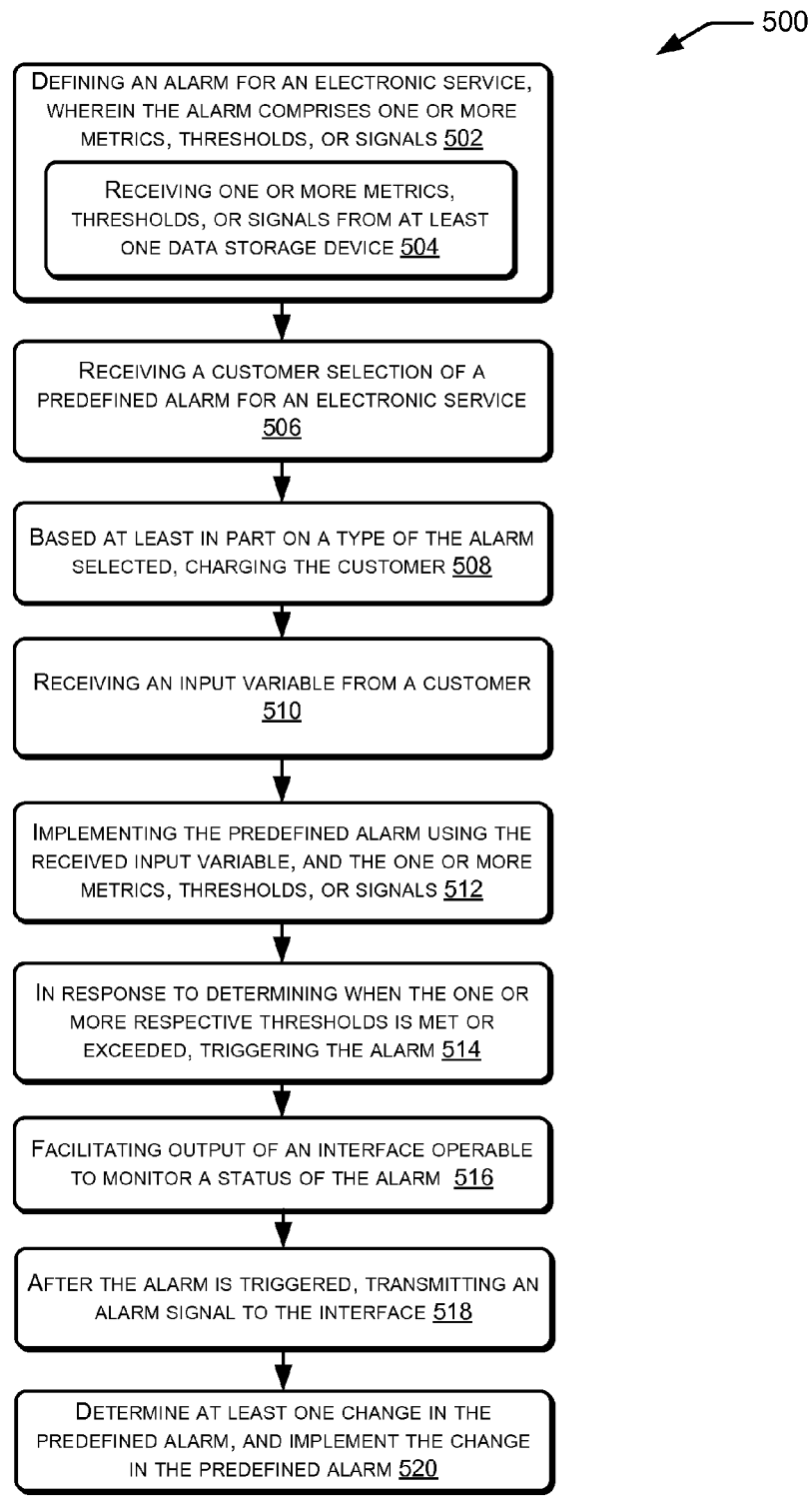
FIG. 5 illustrates an example flow diagram of example processes for intentional monitoring in accordance with embodiments of the invention.

FIG. 5 illustrates an example flow diagram of example processes 500 for intentional monitoring. The processes are illustrated as a logical flow diagram, each operation of which represents one or a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes. Additionally, the described processes may be performed by any number of suitable architectures and/or associated components, such as the architecture 100 and associated service provider computers 110 and/or intentional monitoring service computers 112 illustrated in FIG. 1.

Turning first to FIG. 5, example processes 500 for intentional monitoring are illustrated. In some embodiments, the processes 500 may begin by defining an alarm for an electronic service, wherein the alarm includes one or more metrics, respective thresholds, or signals, at block 502. For example, an administrator interacting with an alarm module, such as 160 in FIG. 1, can define an alarm for an electronic service including one or more metrics and respective thresholds. Additionally or alternatively, at block 504, one or more metrics, respective thresholds, or signals can be received from at least one data storage device. For example, the alarm module 160 can obtain or otherwise receive one or more predefined metrics, respective thresholds, or signals from at least one data storage device, such as data 152 stored in memory 132.

In block 506, a customer selection of a predefined alarm for an electronic service can be received. For example, the alarm module 160 can obtain or otherwise receive a customer selection of a predefined alarm, which can be input via an interface, such as 122.

Additionally or alternatively, based at least in part on a type of alarm selected, the customer can be charged, in block 508. For example, the alarm module 160 can charge a monetary amount to the customer based at least in part on a type of alarm selected by the customer.

In block 510, an input variable from a customer can be received. For example, the alarm module 160 can receive an input variable from a customer via the interface 122.

In block 512, the predefined alarm is implemented using the received input variable, and the one or more metrics, thresholds, and signals. For example, the monitoring module 164 can receive the predefined alarm from the alarm module 160, and implement the predefined alarm using the received input variable from the customer.

In block 514, the alarm can be triggered in response to determining when the one or more respective thresholds is met or exceeded. For example, a monitoring module, such as 164, can determine when one or more respective thresholds is met or exceeded. The monitoring module 164 can communicate with a trigger module, such as 168, which can trigger the alarm in response.

In some embodiments, an output of an interface operable to monitor a status of the alarm can be facilitated, in block 516. For example, the trigger module 168 can facilitate output of an interface, such as website 106, which can be operable monitor a status of the alarm.

In some embodiments, after the alarm is triggered, an alarm signal can be transmitted to the interface, in block 518. For example, the trigger module 168 can transmit an alarm signal to the interface or website 106 after the alarm is triggered.

In some embodiments, at least one change in the predefined alarm can be determined, and the change in the alarm can be implemented, in block 520. For example, an administrator can utilize the alarm module 160 to change one or more metrics, thresholds, or signals in a predefined alarm or otherwise receive a command or instructions to change one or more metrics, thresholds, or signals. The alarm module 160 can then implement the change in the predefined alarm.

In some embodiments, in response to determining when the one or more respective changed thresholds is met or exceeded, the alarm can be triggered. For example, the monitoring module 160 determine when one or more respective changed thresholds is met or exceeded, and can communicate with the trigger module 168, which can trigger the alarm in response.

The operations described and shown in the methods and/or processes 500 of FIG. 5 may be carried out or performed in any suitable order as desired in various embodiments. Additionally, in certain embodiments, at least a portion of the operations may be carried out in parallel. Furthermore, in certain embodiments, less than or more than the operations described in FIG. 5 may be performed.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some embodiments.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, certain embodiments may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain embodiments could include, while other embodiments do not include, certain features, elements, and/or operations. Thus, such conditional language is not generally intended to imply that features, elements, and/or operations are in any way required for one or more embodiments or that one or more embodiments necessarily include logic for deciding, with or without user input or prompting, whether these features, elements, and/or operations are included or are to be performed in any particular embodiment.

Many modifications and other embodiments of the disclosure set forth herein will be apparent having the benefit of the teachings presented in the foregoing descriptions and the That which is claimed:

1. A system, comprising:
at least one memory that stores computer-executable instructions;
at least one processor that accesses the at least one memory and executes the computer-executable instructions to:
allow an administrator to define an alarm rule for an electronic service, the alarm rule comprising one or more predefined metrics and respective predefined thresholds for triggering an alarm, the electronic service being a web service;
provide a user interface that allows selection, by a customer of the electronic service, of the alarm at least in part by presenting a description of the alarm without presenting the one or more predefined metrics and respective predefined thresholds defining the alarm rule;
receive at least one input variable for the alarm from the customer through the user interface; and
implement the alarm using the at least one input variable.

2. The system of claim 1, wherein the at least one processor further executes computer-executable instructions to:
describe the alarm presented for selection by the customer without describing the one or more predefined metrics and respective predefined thresholds defining the alarm rule; and
receive a selection of the alarm from the customer.

3. The system of claim 1, wherein the at least one input variable comprises at least one of the following: a metric period, a billing amount, or a consumption amount.

4. The system of claim 1, wherein the alarm comprises at least one of the following: a stuck volume alarm, a billing amount alarm, or a consumption amount alarm.

5. The system of claim 1, wherein the electronic service comprises at least one of the following:
mountable storage volume service,
a cloud computing service,
a database service,
a workflow management service,
a queue service,
a load balancing service,
a map reduce service, or
a cluster computer service.

6. The system of claim 1, wherein the at least one processor executes the computer-executable instructions to allow the administrator to define the alarm rule for the electronic service executes computer-executable instructions to receive the one or more predefined metrics and respective predefined thresholds from at least one data storage device.

7. The system of claim 1, wherein the user interface is a graphical interface provided to the customer at least in part for inputting the at least one input variable for the alarm.

8. The system of claim 1, wherein the user interface is provided to the customer at least in part for inputting code associated with the at least one input variable for the alarm.

9. The system of claim 1, wherein:
the user interface is provided to the customer at least in part to allow the customer to monitor a status of the alarm; and
at least one processor further executes computer-executable instructions, as a result of the alarm being triggered, to alert the customer via the user interface.

10. The system of claim 1, wherein the at least one processor further executes computer-executable instructions to:
receive at least one change in the one or more predefined metrics or predefined thresholds; and
wherein the alarm rule comprises the at least one change in the one or more predefined metrics or predefined thresholds.

11. The system of claim 1, wherein the at least one processor further executes computer-executable instructions to:
charge the customer in response to:
the alarm rule being defined,
the electronic service monitoring for satisfaction of the alarm rule, or
the alarm being triggered.

12. A method, comprising:
providing a user interface that allows selection, by a customer of an electronic service, of an alarm at least in part by presenting a description of the alarm without describing a set of alarm rules for triggering the alarm;
receiving a customer selection of the alarm for the electronic service;
receiving an input variable from the customer through a user interface; and
implementing the customer selection using the input variable received, and the set of alarm rules, the set of alarm rules comprising one or more metrics, thresholds, or signals from a component of the electronic service, the electronic service being a web service.

13. The method of claim 12, wherein the input variable received from the customer comprises at least one of the following:
a metric period,
a billing amount, or
a consumption amount.

14. The method of claim 12, wherein the one or more signals from the component indicates at least one of the following:
a detected problem with the component,
a status of the component,
a status of the electronic service, or
a detected problem with the electronic service.

15. The method of claim 12, wherein the alarm comprises at least one of the following:
a stuck volume alarm,
a billing amount alarm, or
a consumption alarm.

16. The method of claim 12, wherein the set of alarm rules is associated with monitoring at least one of the following:
a mountable storage volume service,
a cloud computing service,
a database service,
a workflow management service,
a queue service,
a load balancing service,
a map reduce service, or
a cluster computer service.

17. The method of claim 12, further comprising receiving the set of alarm rules from at least one data storage device.

18. The method of claim 12, wherein the user interface is a graphical interface, the method further comprising outputting the graphical interface for the customer to receive the customer selection of the alarm and the input variable.

19. The method of claim 12, further comprising providing the customer with the user interface at least in part to allow the customer to input code associated with the at least one input variable for the alarm.

20. The method of claim 12, further comprising:
outputting the user interface operable for monitoring a status of the alarm; and
as a result of the alarm being triggered, transmitting an alarm signal to the user interface.

21. The method of claim 12, further comprising:
determining at least one change in the set of alarm rules; and
implementing the at least one change in the set of alarm rules.

22. The method of claim 12, further comprising setting a price to charge the customer in response to the customer selecting the alarm.

23. A system, comprising:
at least one memory that stores computer-executable instructions;
at least one processor that accesses the at least one memory and executes the computer-executable instructions to:
provide a user interface that allows selection, by a customer of an electronic service, of an alarm at least in part by presenting a description of the alarm without describing a set of rules for triggering the alarm;
receive a customer selection of the alarm for the electronic service;
receive an input variable from the customer through the user interface;
implement the customer selection using the input variable received, and the set of rules, the set of rules comprising one or more metrics, thresholds, or signals from a network component of the electronic service, the electronic service being a web service;
receive at least one change in the metrics or thresholds of the set of rules; and
implement the at least one change in the set of rules.

24. The system of claim 23, wherein the at least one processor further includes computer-executable instructions to:
trigger the alarm as a result of the one or more thresholds being met or exceeded; and
alert the customer as a result of the alarm being triggered.

25. The system of claim 23, wherein the input variable comprises at least one of the following:
a metric period,
a billing amount, or
a consumption amount.

26. The system of claim 23, wherein the alarm comprises at least one of the following: a stuck volume alarm, a billing amount alarm, or a consumption amount alarm.

27. The system of claim 23, wherein the system is operable to monitor the electronic service for fulfillment of a condition of the set of rules, the electronic service comprising at least one of the following:
a mountable storage volume service,
a cloud computing service,
a database service,
a workflow management service,
a queue service,
a load balancing service,
a map reduce service, or
a cluster computer service.

28. The system of claim 23, wherein the at least one processor further executes computer-executable instructions to charge the customer in response to receiving the customer selection by the customer.

29. One or more non-transitory computer-readable media storing computer-executable instructions that, when as a result of execution by at least one processor, configure the at least one processor to:
provide a user interface that allows selection, by a customer of an electronic service, of an alarm for the electronic service at least in part by presenting a description of the alarm without describing a set of rules for triggering the alarm;
receive a customer selection of the alarm through the user interface, wherein the electronic service is a web service;
receive an input variable from the customer; and
implement the customer selection using the input variable received, and the set of rules, the set of rules comprising one or more metrics, thresholds, or signals from a network component of the electronic service.

30. The one or more non-transitory computer-readable media of claim 29, comprising additional computer-executable instructions to configure the processor to output the user interface for the customer at least in part to allow the customer to select the alarm or to input the input variable.

31. The one or more non-transitory computer-readable media of claim 29, comprising additional computer-executable instructions to configure the processor to:
receive a change to one or more metrics or thresholds for the set of rules: and
implement the customer selection with the change to the one or more metrics or thresholds for the set of rules.

32. The one or more non-transitory computer-readable media of claim 29, comprising additional computer-executable instructions to configure the processor to charge the customer for selecting the alarm.

* * * * *